E. J. BRYANT.
EXTERNAL LIMIT GAGE.
APPLICATION FILED JAN. 8, 1915.
1,279,645.
Patented Sept. 24, 1918.
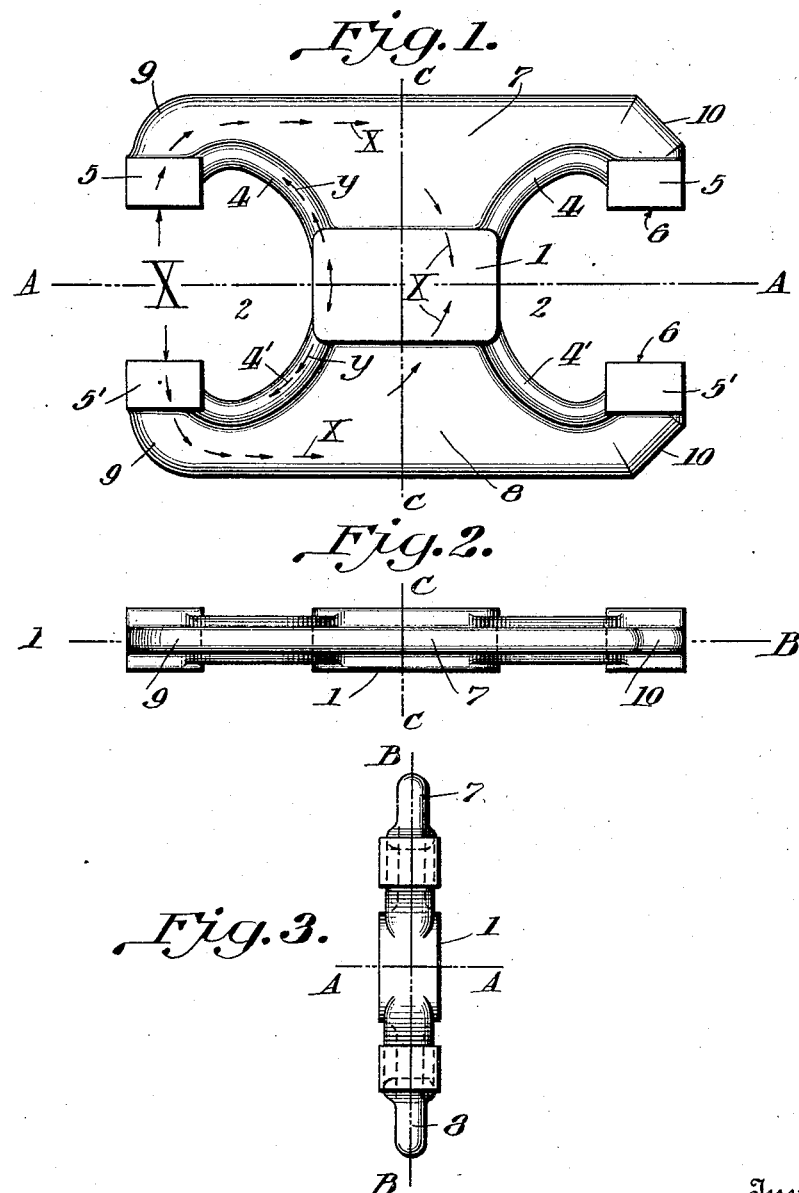

UNITED STATES PATENT OFFICE.

ELMER J. BRYANT, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

EXTERNAL LIMIT-GAGE.

1,279,645.

Specification of Letters Patent.

Patented Sept. 24, 1918.

Application filed January 8, 1915. Serial No. 1,229.

*To all whom it may concern:*

Be it known that I, ELMER J. BRYANT, a citizen of the United States, and a resident of the city of Woonsocket, in the county of Providence, State of Rhode Island, have invented new and useful Improvements in External Limit-Gages, of which the following is a specification.

This invention relates broadly to tools and more particularly to external limit gages.

The principal object of this invention is to produce a limit gage of the fixed jaw type wherein the working faces of the jaws are rigidly supported to prevent any opening of the jaws due to springing or bending of the metal.

Another object of this invention is to produce an external limit gage having fixed jaws, of such construction as will obviate change of dimensions in the jaws as the metal assumes its normal set after the gage has been ground to predetermined dimensions.

Another object of this invention is to produce a double ended external gage with the jaws of each side connected by a rigid body portion constructed to resist forces at right angles to the measuring faces of the jaws.

A still further object of this invention is to construct a double ended external limit gage of the fixed jaw type of a substantially rectangular form having each end constructed to comprise an indicator for the character of the gage formed adjacent thereto.

Still other and further objects of this invention will in part be obvious and will in part be pointed out in the specification hereinafter following by reference to the accompanying drawings in which like characters are used to represent like parts throughout the several figures thereof.

Figure 1 is a plan view of the gage. Fig. 2 is a top view of the gage. Fig. 3 is an end view.

Double ended forged or cast external limit gages, so far as applicant is aware, have hitherto been constructed of a body portion having the general outline of an hour-glass or figure 8, with the working faces in the ends of the body portion. In gages of this type, when used to measure extremely accurate dimensions, there is a considerable amount of "spring", which to a more or less degree affects the accuracy of measurements to be determined by the gage. Furthermore, in gages of the hour-glass type there is considerable possibility of the metal being slightly varied in each end of the body portion and after the gage has been manufactured the metal in taking its normal set will slightly change the dimension to which the gage had originally been ground. In double end gages one end is usually accurately ground to a predetermined dimension; and the other end is usually ground somewhat smaller than the dimension to be measured. The small end is designated as "not go" whereas the other end is designated as "go", the "go" end being used to pass work, and the "not go" to reject work which will fit in the small gage. It is extremely desirable that the form of the gage itself will indicate which is the "go" end, and which is the "not go" end. This has heretofore been done in drop forged cast gages by stamping the dimension or words on the ends of the gage. Necessarily such an indicator can only be read in relatively strong light.

The gage comprising the present invention, is constructed with substantially a rectangular body portion adapted to resist forces tending to spring the jaws open. This gage is of drop forged steel construction wherein the thickness of the metal is symmetric, and thereby changes in form due to aging of the metal is effectively prevented. The rectangular body form enables the ends to be constructed so that the outline of the gage itself becomes an indicator as to the character of gage carried by each end.

Referring now more particularly to the drawings, the central portion of the gage comprises a substantially rectangular pad 1 having plane surfaces which are well adapted to receive designating lettering of any desired character. Arch-shaped openings 2 are bounded by rounded beads or ribs 4—4' which have a through dimension slightly less than the pad 1. Small rectangular terminal pads 5—5 extend from the beads or ribs 4 to the end of the gage and in a similar manner terminal pads 5'—5' extend from the beads or ribs 4'—4' to the end of the gage. These pads are provided on their inner faces with plane parallel surfaces 6 that are arranged in opposite pairs and are accurately ground so that the clear space between the plane surfaces represents a predetermined dimension. The sides of the gage are preferably formed of webs 7 and 8 which extend lengthwise between the terminal pads and comprise very rigid compression members. The major axes of the webs it will therefore be noted extend lengthwise of the gage and parallel to the work faces on the terminal pads. The whole of the specified gage herein illustrated is formed from a single steel drop forging, and therefore the various elements previously outlined are integral; consequently it will be noted that the web 7 joins the pad 1, the ribs 4—4 and the small pads 5—5, whereas the rib 8 joins the ribs 4'—4' and the small pads 5'—5'.

When the gage is in use the jaws are subjected to forces tending to separate the terminal pads, as for example, as indicated by the arrows X. These forces are transmitted to the webs 7 and 8 as compression stresses indicated by the arrows $x$; to the ribs 4—4' as tension stresses indicated by the arows $y$; and to the large central paid 1 as both tension and compression stresses indicated by the arrows $x$ and $y$.

In order to designate the work ends of the gage the "go" end is indicated by the small rounded corners 9, whereas the smaller or "not go" end is indicated by the angular corners 10.

An analysis of the previously described construction will show that the main body of the gage is formed of the webs 7 and 8, which are of a relatively thin cross section of uniform thickness, whereas the pads 1 and 5—5', are also uniform in thickness and represent the thickest part of the gage, while the ribs or beads 4—4' join the said pads and represent an intermediate thickness. Particularly will it be noted that the whole of the gage is symmetrical either to a plane A—A intersecting the gage transversely or to the plane B—B intersecting the gage longitudinally, and except for the designating ends 9 and 10, to a plane C—C intersecting the gage transversely. In view of this symmetry and uniform distribution of metal, the gage when once formed will not be distorted due to molecular changes which take place in non-symmetrical, or irregularly, or openly formed metallic devices of this character.

It is physically possible to vary somewhat the specific construction herein disclosed without departing from my invention; therefore, I desire that it be understood that the specific form shown herein is to be understood as being illustrative and not to be interpreted in a limiting sense.

Having thus described my invention what I desire to claim is:—

1. As an article of manufacture, an external limit gage formed of a unitary steel drop forging having a central thick portion, terminal pads having parallel opposed work faces, curved ribs extending from the central thick portion to said terminal pads, and relatively thin webs extending over and between said terminal pads, said webs having straight outer edges and having their major axes parallel to the work faces on the terminal pads; the construction and arrangement of parts comprising a substantially rectangular form so that when pressure is delivered against said work faces the thick portion acts as a keystone to support both tension and compression stresses, the ribs acting as tension members and the webs acting as compression members, substantially as specified.

2. As an article of manufacture, an external limit gage formed of a unitary steel drop forging and having a relatively thick central portion, arch-shaped ribs extending outwardly from said central portion, terminal pads adjacent the ends of said arch-shaped ribs, said terminal pads being provided with parallel opposed work faces being spaced a predetermined distance, and supporting webs having outer edges substantially parallel to said work faces and extending over and between said terminal pads, the major axes of said supporting webs being substantially parallel to the work faces on said terminal pads.

3. As an article of manufacture, a double ended external limit gage comprising a unitary piece of metal having a sustaining member at the central portion of the gage, ribs connecting with said sustaining member and extending outwardly therefrom, terminal pads connected with said ribs and being formed with opposed work faces spaced apart predetermined dimensions, and webs extending between said ribs and comprising compression members adapted to withstand compression forces, the greatest width of said webs being at substantially the transverse mid portion of the gage on a plane at right angles to the plane of the work faces.

ELMER J. BRYANT.

Witnesses:
  Roy J. Soules,
  Austin M. Wilson.

Copies of this patent may be obtained for five cents each, by addressing the "Commissioner of Patents, Washington, D. C."